United States Patent [19]
McCarthy et al.

[11] Patent Number: 4,494,423
[45] Date of Patent: Jan. 22, 1985

[54] AUTOMATIC TRANSMISSION CONTROL FOR AN AUTOMOTIVE VEHICLE DRIVELINE HAVING FAIL-SAFE LOGIC

[75] Inventors: James P. McCarthy, Inkster; Richard E. Byler, Livonia, both of Mich.

[73] Assignee: Ford Motor Company, Dearborn, Mich.

[21] Appl. No.: 421,770

[22] PCT Filed: Aug. 4, 1982

[86] PCT No.: PCT/US82/01062
§ 371 Date: Aug. 4, 1982
§ 102(e) Date: Aug. 4, 1982

[51] Int. Cl.³ ............................................. B60K 41/04
[52] U.S. Cl. .................. 74/869; 74/752 C; 74/867; 74/868
[58] Field of Search ............ 74/867, 878, 752 A, 74/843, 856, 860, 861, 864, 865, 866, 868, 869, 752 D, 752 C, 751

[56] References Cited

U.S. PATENT DOCUMENTS

| | | | |
|---|---|---|---|
| 3,625,080 | 12/1971 | Rachel et al. | 74/866 X |
| 3,705,642 | 12/1972 | Thompson | 74/869 X |
| 3,726,157 | 4/1973 | Marumo | 74/753 |
| 3,937,108 | 2/1976 | Will | 74/866 |
| 3,943,799 | 3/1976 | Sakai et al. | 74/866 |
| 4,058,028 | 11/1977 | Estaque | 74/865 |
| 4,233,860 | 11/1980 | Kadelbach et al. | 74/752 A |
| 4,262,783 | 4/1981 | Scarrott et al. | 192/0.09 |
| 4,331,046 | 5/1982 | Leonard et al. | 74/867 |
| 4,345,489 | 8/1982 | Müller et al. | 74/752 A |
| 4,351,206 | 9/1982 | Lemieux et al. | 74/866 |
| 4,418,587 | 12/1983 | Kauffman | 74/867 |

FOREIGN PATENT DOCUMENTS

| | | | |
|---|---|---|---|
| 2040195 | 12/1979 | Fed. Rep. of Germany | 74/866 |
| 55-36611 | 3/1980 | Japan | 74/866 |
| 2029524 | 3/1980 | United Kingdom | 74/867 |
| 2039639 | 8/1980 | United Kingdom | 74/866 |
| 2090926 | 7/1982 | United Kingdom | 74/861 |

Primary Examiner—Leslie A. Braun
Assistant Examiner—Dwight G. Diehl
Attorney, Agent, or Firm—Frank G. McKenzie; Donald J. Harrington

[57] ABSTRACT

A control system for operating the clutch and brake elements of a multiple speed ratio transmission includes a manual valve that opens line pressure to a transfer valve, which in its first state pressurizes a feed line through which any of the clutches and servos may be selectively pressurized. In its second state, the transfer valve pressurizes the clutches whose engagement that produces a predetermined speed ratio. The detector valve moves the transfer valve to the second state if the combination of pressurized clutches and servos is other than the combination that produces a drive ratio in normal operation.

8 Claims, 7 Drawing Figures

FIG. 4

AUTOMATIC TRANSMISSION CONTROL FOR AN AUTOMOTIVE VEHICLE DRIVELINE HAVING FAIL-SAFE LOGIC

BACKGROUND OF THE INVENTION

1. Field of the Invention

This invention pertains to a hydraulic control system for an automatic transmission and more particularly to such a system, which upon sensing an unacceptable combination of pressurized clutches and servos reverts to the combination that produces a predetermined speed ratio.

2. Description of the Prior Art

Automatic transmissions for automotive use include planetary gearsets, whose elements are hydraulically engaged or braked in order to produce selected speed ratios between the engine crankshaft and the output shaft of the transmission. Automatic gear change transmissions may be controlled by electronic means which produce digital voltage signals that are converted to analog signals to operate solenoid valves. These valves connect hydraulic line pressure to the selected clutches and brakes or vent the hydraulic cylinder of these elements to atmosphere. The control system should operate such that in the event of a control system failure the transmission may operate in at least one forward drive range and in the reverse drive range in order to permit driving the vehicle to a service or repair station.

SUMMARY OF THE INVENTION

It is an object of this invention that the transmission be automatically set for operation in a predetermined gear ratio if a malfunction is sensed that causes the clutches and brakes to be operated so as to prevent rotational movement of the engine or driveshaft. The hydraulic control system according to the invention senses a concurrent application of three or more clutch or brake elements, concurrent application of the low-reverse band and the intermediate clutch, and concurrent application of the low-reverse band and the direct clutch.

The hydraulic control circuitry for realizing this objective includes a detector valve having four differential areas each of which communicates with hydraulic lines that pressurize each of the friction elements. When the combination of differential areas are pressurized so as to correspond to one of the malfunctions sensed by the circuit, a pressure force is developed on a transfer valve causing it to move to a second state. Opposing the force on the detector valve is a transfer valve that performs several functions.

The transfer valve produces a force opposite that of the detector valve. These forces vary linearly with the line pressure thereby maintaining equilibrium with the hydraulic fail-safe system despite changes in line pressure. If a malfunction is sensed, during the resultant fail-safe operation, the detector valve directs line pressure to the forward clutch and intermediate clutch thus causing the transmission to operate in second gear. In the fail-safe mode, the transfer valve disconnects line pressure from the solenoid-operated valves through which the various clutches and brake elements of the transmission are normally pressurized. This is done to prevent a malfunctioning solenoid circuit from pressurizing friction elements other than those required to be pressurized for operation in the second gear ratio. The friction elements other than those required for second gear operation are vented through the transfer valve if a malfunction is sensed. The transfer valve maintains the hydraulic control system in the second gear ratio through action of the transfer valve that shuttles to the fail-safe position. In the second state line pressure applied to an area of the transfer valve larger than that which creates the detector valve opposing force maintains the transfer valve in the fail-safe condition until the manual valve is moved out of the Overdrive, Drive, or one-range and into Park, Reverse or Neutral. This action permits an easy resetting of the transfer and detector valves if this valve combination incorrectly senses a malfunction or following a malfunction that has been rectified. However, these valves will immediately return to the fail-safe position if another malfunction is sensed.

The detector valve has four pressure areas formed on a spindle that moves between a first, or normal operation state, and a second, or fail safe state. During normal operation only two of these areas are concurrently pressurized except during a shift transient when more than two are pressurized but only two at line pressure levels. The areas of the detector valve and transfer valve are sized such that when any two detector valve areas are pressurized concurrently, the pressure force developed on the detector valve spool is insufficient to overcome the opposing force of the transfer valve.

However, concurrent pressurization of any three pressure areas causes the pressure force on the detector valve spool to overcome the resisting force on the transfer valve spool, thereby snapping the transfer valve into the fail-safe position. The pressure areas for the low-reverse concurrent pressurization of these will cause entry into the fail-safe mode.

A fourth malfunction represented by the concurrent application of line pressure to the low-reverse band and the direct clutch is sensed by a shuttle valve separate from the detector-transfer valve combination. It is preferable that the shuttle valve be used in this way because the low-reverse band and direct clutch are never applied sequentially in normal operation, their pressurization being separated by second gear ratio operation.

An object of the fail-safe system according to this invention is to permit the vehicle to be operated after failure occurs in at least one forward drive range and in the reverse drive range. Second gear operation in the fail-safe condition is considered the most acceptable gear ratio for the transmission whose operation is described, however, any forward gear ratio could have been chosen as the ratio to which the system defaults when a malfunction is sensed.

DESCRIPTION OF THE PREFERRED EMBODIMENT

Figure 1:
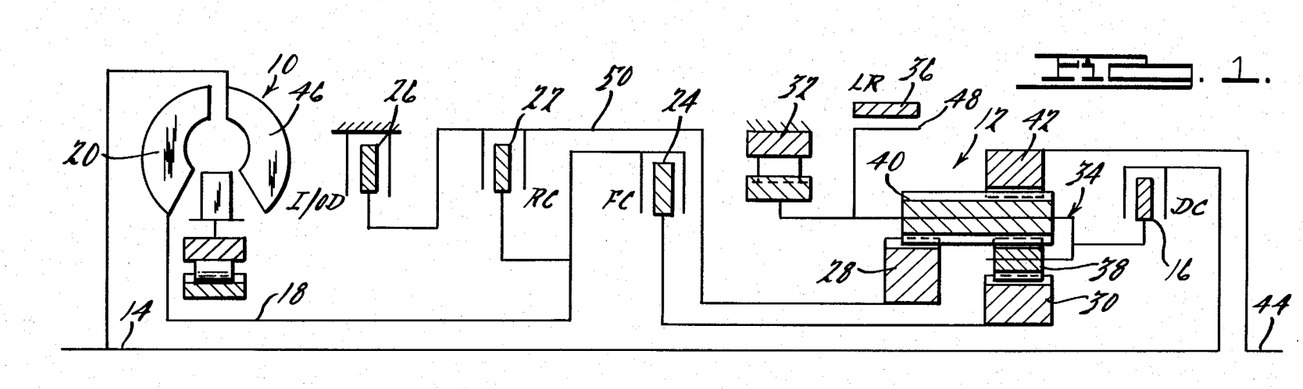
FIG. 1 is a schematic diagram of the gear arrangement, clutches, brakes and torque converter of an automatic transmission to which the control system of this invention may be applied.

FIG. 1 shows an example of a gear train for which the hydraulic control system according to the present invention may be applied.

The compound planetary gearset 12 provides four forward speed ratios that include one direct drive, an overdrive and two speed reductions and reverse drive depending on the selective engagement of the various clutches and the brake band.

The transmission includes a torque converter 10 which couples the engine (not shown) to the planetary gearset 12 and provides torque multiplication that is equivalent to an additional gear reduction in certain driving conditions. A direct drive shaft 14 couples the engine directly to the direct clutch 16, bypassing the torque converter. A turbine input shaft 18 splined to the turbine 20 of the torque converter transmits torque from the converter to the reverse clutch 22 and to the forward clutch 24. An intermediate/overdrive clutch 26 holds the reverse sun gear 28 stationary in the second gear ratio, in overdrive and in second gear in range 1, i.e., manually selected low gear. The reverse clutch 22 couples turbine input shaft 18 to the reverse sun gear 28 in reverse gear only. The forward clutch 24 couples turbine input shaft 18 to the forward sun gear 30 in first, second and third gear.

A planetary one-way clutch 32 holds planet carrier 34 to produce first gear drive when the gear selection lever is positioned in the overdrive range and in the 3-range. Clutch 32 also permits free-wheeling during an automatic coasting downshift while in first gear. The low reverse band 36 is applied and released through operation of a low reverse servo (not shown), holds planet carrier 34 stationary in low gear and reverse gear, and permits engine braking in manually selected low gear. Direct clutch 16 couples direct driveshaft 14 to the planet carrier assembly in third or direct gear and in overdrive. When the gear selector is manually set by the operator to the overdrive position, the transmission will upshift and downshift automatically through all four forward gears. From a standing start, the transmission is in low gear and successively upshifts to second, direct and overdrive as road speed increases. During coasting or braking, the transmission downshifts through all the gears as the vehicle coasts and comes to a stop. Operation in the overdrive gear ratio can be prevented by moving the shift selector to the Drive range where the transmission upshifts and downshifts only through first, second and direct gear ratios. When the shift selector is moved to the manual low position or 1-range, the transmission is locked in low gear and the low-reverse band is applied for engine braking. If the shift selector is moved to the 1-range from Overdrive or Drive the transmission will downshift to second at road speeds greater than 25 mph then downshift to the first speed ratio at road speeds less than 25 mph.

GEAR ARRANGEMENT AND CLUTCHES

The planetary gearset 12 includes reverse sun gear 28 driven by the turbine input shaft 18 when reverse clutch 22 is applied. Sun gear 28 can also be held stationary by applying intermediate/overdrive clutch 26 instead. Forward sun gear 30 is driven in first, second and third gear ratios from the turbine input shaft through the forward clutch 24. Forward sun gear 30 continuously meshes with the short pinions 38, which mesh with long planet pinions 40. The short pinions do not mesh with the ring gear 42, but drive the ring gear through the long pinions. The long pinions 40 and short pinions 38 are mounted for rotation on carrier 34, which can be held stationary by either the low reverse band 36 or the planetary one-way clutch 32. Reverse sun gear 28 also meshes with long pinions 40. Ring gear 42 is drivably coupled to the output shaft 44 and the output from the gearset is always through ring gear 42.

In the overdrive range and the drive range, the first gear ratio is produced by applying the forward clutch 24 and holding planet carrier 34 from turning by applying planetary one-way clutch 32. In this case, the engine drives the impeller 46 of the converter whose turbine 20, driven hydraulically, drives the forward sun gear 30 through the turbine shaft 18 and forward clutch 24. Sun gear 30 drives the short pinions 38 which drive the long pinions 40 and these drive the ring gear at a reduced speed from that of the turbine shaft.

In a coast condition, one-way clutch 32 overruns; therefore there is no engine braking in the first gear of the overdrive and drive ranges. To provide engine braking the shift selector is moved to the 1-range (manual low) and low reverse band 36 is applied to hold carrier drum 48 against rotation. In this way engine braking is available, whereas in the overdrive and drive ranges the planetary one-way clutch would be overdriven.

In the overdrive and drive ranges, the second or intermediate gear ratio is produced by applying the intermediate/overdrive clutch 26, thereby fixing reverse sun gear 28 to the transmission case, and by applying forward clutch 24, thereby locking turbine shaft 18 to the forward sun gear 30. In this case, the planetary gearset is driven from the forward sun gear 30 and reverse sun gear 28 provides a reaction point. The forward sun gear drives short pinions 38 and long pinions 40, which drive the ring gear 42 and the output shaft 44 around the circumference of the stationary sun gear 28.

When direct clutch 16 is applied direct drive input shaft 14 drives the planet carrier assembly 34 at engine speed by-passing the converter turbine 20. The planetary one-way clutch 32 overruns when the direct clutch is applied. The third gear ratio in the direct drive range is produced when the forward clutch 24 is applied to lock the turbine shaft 18 to the forward sun gear 30 and the direct clutch 16 is applied to couple the direct drive input shaft 14 to the planet carrier 34. When this is done the direct clutch drives the planet carrier at engine speed, the converter turbine 20 is driven hydraulically near engine speed and the turbine shaft drives the forward clutch and the forward sun gear. This effectively locks up the gearset which rotates as a unit causing the long pinions 40 to drive the output shaft 44.

In the overdrive range the fourth speed ratio is produced when intermediate/overdrive clutch 26 is applied to fix reverse sun gear 28 to the transmission casing and direct clutch 16 is applied to couple the planet carrier 34 to the engine. With these clutches applied, drive shaft 14 drives carrier 34 at engine speed; the long planet pinions 40 revolve around the circumference of reverse sun gear 28, held stationary by clutch 26; and ring gear 42 and output shaft 44 are driven by pinions 40 at a speed faster than the engine speed.

When reverse clutch 22 is applied, the turbine input shaft 18 is coupled to the clutch drum 50, which is fixed to the reverse sun gear 28. Therefore, when clutch 22 is applied, sun gear 28 is driven at turbine speed in addition to applying the reverse clutch. Reverse drive is produced when the low/reverse band 36 is applied to hold planet carrier 34 stationary. The torque delivery path for reverse drive, therefore, includes the impeller turbine 20, driven hydraulically from the impeller 46; reverse sun gear 28, which drives the long planet pinions 40; and the ring gear output shaft, which is driven by the planet pinions. The short planet pinions 38 and the forward sun gear 30 are caused to rotate in reverse drive but they do not transmit torque.

LINE PRESSURE REGULATION

The transmission is supplied with enough fluid to fill the torque converter, to operate the hydraulic controls, to lubricate the working parts and to maintain the reserve of fluid stored in the oil pan at the bottom of the case, the sump 52. The pump 54 is a positive displacement pump that supplies a volumetric flow rate in proportion to the speed at which it is driven. A screen 53 protects the pump inlet from dirt and other fine materials carried in the hydraulic fluid. A line pressure hydraulic line 58 supplies the manual valve 60 and a low pressure regulator valve 62. The outlet of the pump is also supplied to the control chamber 64 of the pressure regulator 56 through an orifice 65 which operates to prevent cycle flow toward and away from the control chamber. Generally, there is no flow into and out of control chamber 64; therefore, there is no pressure drop across orifice 65 whose presence in the circuit is to prevent high frequency alternating flow within chamber 64. The converter inlet chamber 66 is also supplied from the outlet of the pump from which the torque converter 10 is supplied from outlet passage 67 according to the magnitude of line pressure and the effect it has on the position of regulator valve spool 68. The pump outlet communicates through an orifice 69 with a chamber 70 that is in continuous communication with hydraulic line 71, through which line pressure regulator solenoid valve 72 and line pressure relief valve 74 are supplied. The upper end of regulator valve 56 is closed by a blocking member 76 that provides support at one end for the spring 78 that urges spool 68 downward.

As pressure in the hydraulic lines begins to rise, spool 68 moves against the spring due to the pressure force applied to the end face of the spool at the control chamber 64. Land 80 opens communication between the converter inlet and outlet chambers 66, 67 causing fluid from the pump outlet to flow into the converter through line 81. Converter relief valve 82 protects the converter from excessive pressure buildup by opening line 81 to the inlet side of the pump if the pressure force on valve 82 exceeds the force of the spring 83. Fluid leaving the converter passes through a check valve 84, which opens at low pressure and through which the cooler 86 is supplied with fluid. When the engine is shut down, the spring 85 reseats the valve and prevents converter oil from draining through the cooler and lube system back to sump so that the torque converter remains full of fluid.

The outlet of the pump is continuously applied to the inlet 55 of line pressure regulator solenoid valve 72 and to the line pressure relief valve 74 regardless of the position of valve sool 68. The force of spring 87 keeps relief valve 74 closed except when the pressure force on the face of valve 74 exceeds the force of the spring which opens line 71 to the vent port 88. Regulation of line pressure results due to opening and closing orifice 90 of the line pressure regulator solenoid valve 72. Solenoid valve 72 includes valve element 92 that is biased downward by spring 61 into contact with the valve seat at orifice 90 when the coil of the solenoid 93 is not energized. When the solenoid coil is energized, the valve element 92 is unseated thus opening the pump discharge through orifice 69 to the vent port 94.

The maximum line pressure is determined by the pressure at which line pressure relief valve 74 opens. The minimum line pressure is determined, when the solenoid coil is energized, by the pressure drops across orifices 69 and 90. For example, if the diameter of orifice 90 is 0.038 inches and the diameter of orifice 69 is 0.030 inches, the minimum line pressure will approximate 60 psi. The maximum line pressure occurs when the solenoid is deenergized and is preferably in the range between 260 and 290 psi, the pressure at which relief valve 74 opens. Line pressure supplied to the manual valve 60 is maintained between the minimum and maximum values by opening and closing orifice 90 in response to a modulated signal applied to the coils of the solenoid.

LOW PRESSURE REGULATION

Low pressure regulator valve 62 supplied with line pressure through lines 58, 59 has a spring 96, which forces valve spool 97 leftward in the valve chamber whereby low pressure hydraulic line 98 communicates with line 59. Control pressure in line 98 is fed back and applied to the end face of land 100 on which a pressure force acting in opposition to the force of spring 96 moves spool 97 rightward as pressure increases in line 98. This rightward movement first closes supply line 59 and then, as pressure in line 98 increases further, opens the space between the lands of spool 97 to communicate line 98 with vent port 101. This drops the pressure in control chamber 102 tending to return spool 97 to its original position where line pressure will again supply the valve.

In this way, the pressure in line 98 is regulated by balancing the control pressure force on the spool against the force of spring 97. If line pressure drops, spring 96 moves spool 97 leftward and stops flow to the sump. If the pressure rises, the valve moves against the spring and bypasses more oil to the sump. In this way, fluid pressure below line pressure is supplied to line 98 by selecting an appropriate spring force for spring 96.

NORMAL CLUTCH AND SERVO ACTUATION

The low pressure in line 98 is supplied to each of four check valves 104–107, each being a member of the solenoid-operated clutch and servo actuator system for operating the intermediate/overdrive clutch 26, forward clutch 24, low/reverse servo 37 and direct clutch 16. The check valves communicate with pilot valves 108–111, to which control pressure is applied by operation of solenoid control valves 112–115. Solenoid valves 113, 115 are normally closed and solenoid valves 112, 114, whose operation in conjunction with check valve 106 and pilot valve 110 for actuating forward clutch 24 will be described, are normally open. The operation of the actuator systems that use normally closed solenoid valves is identical to the operation of the following description except that valves 113 and 115 are opened when the associated solenoid coils are energized.

Check valve 106 has a spring that applies a force tending to close valve element 116, whose movement within the chamber opens and closes communication between inlet port 118 and output port 120. Low pressure hydraulic fluid is supplied from regulator valve 62 through line 98 and port 118 of check valve 106. A pressure force developed on the face of check valve element 116 works in opposition to the force of the spring 117 to open outlet port 120. Initially the cylinder of forward clutch 24 is exhausted and the coils of solenoid 126 are energized, thereby moving ball element 130 downward into a seating, closed position on the inlet of orifice 132. Solenoid valve 114 is normally open, i.e., when its coils are deenergized and due to the effect of compression spring 128, the ball element 130 moves off the valve seat; therefore, line pressure applied through line 134 communicates with line 138. In the closed position hydraulic line 138 communicates instead with the vent port 136.

In order to quickly fill the cylinder of clutch 24 with low pressure, the coils of the solenoid are deenergized and control chamber 140 is pressurized through line 134, orifice 132 and line 138. A pressure force is developed on the end face of spool 122 causing spring 123 to compress thereby opening communication between low pressure line 98 and hydraulic line 142. Hydraulic fluid at low pressure is carried through line 142 to check valve 144 displacing the valve element, closing the fail safe line 146 and pressurizing line 148, through which low pressure fluid is applied to clutch 24. The cylinder of clutch 24 is filled quickly through line 148 at low pressure since there is little resistance to flow until the clearances within the clutch, particular those associated with the disk pack, are taken up. Then the pressure within the clutch cylinder reaches the shut off pressure as determined by the force of spring 117. Hydraulic pressure fed back to the spring side of check valve element 116 applies a hydraulic force to element 116 that adds to the force of spring 117. When the pressure within the cylinder of clutch 24 has reached a predetermined magnitude, which preferably is near 10 psi., check valve 106 closes outlet port 120 and terminates the filling of the clutch cylinder with low pressure hydraulic fluid.

The pressure force on valve spool 122 acting against the force of spring 123 causes the spool to open high pressure outlet port 150 thereby communicating the cylinder clutch 24 with high pressure inlet port 132 of the solenoid valve 114. The pressure force developed on the piston of clutch 24 operates to drivably connect the clutch housing and input shaft 18 to the forward sun gear 30.

In order to depressurize clutch 24, the coils of solenoid 126 are energized causing ball 130 to move downward and close inlet orifice 132. This opens communication between the cylinder of clutch 24 and vent port 136 by way of line 148, check valve 144, line 142, control chamber 140 and line 138. When this communication is opened, hydraulic fluid is quickly vented from the cylinder of clutch 24. When high pressure in the clutch cylinder falls to approximately 15 psi., spool 122 of the pilot valve 110 moves to the upper end of the chamber thus closing port 150 and opening vent port 152, which communicates with the sump through an orifice 154. After this occurs, the piston of clutch 24 is moved by a compression spring to the depressurized position within the cylinder of clutch 24 and the remainder of the hydraulic fluid is vented through pilot valve 110 and vent port 152 to the sump. There is an approximate 5 psi. difference maintained between the check valve shut off pressure and the pilot valve vent pressure.

During normal operation, the intermediate/overdrive clutch 26 is pressurized through line 158, which applies line pressure and low pressure fluid to a check valve 160 to which a failsafe line 162 from a transfer detector valve 164 is applied in a manner similar to that of the forward clutch failsafe line 146 applied to check valve 144. Line 166 communicates with either line 158 or 162 depending on which has the higher pressure and connects the higher pressure line to the cylinder of the intermediate/overdrive clutch 26. Line 168 connects line 166 with node 170 from which hydraulic fluid is applied through line 172 to the intermediate/low reverse chamber 174 of detector valve 164.

Similarly, the clutch control system for low/reverse servo 37 pressurizes line 186 through which line pressure and low pressure hydraulic fluid is applied through check valve 188 and line 190 to a node point 192. Node 192 has a line 194 that leads to a reverse, low/reverse chamber 176 of the detector valve 164.

Node 196 is the point at which line 148, leading to check valve 144, is connected to line 198, through which the forward clutch chamber 178 of detector valve 164 is pressurized. Node 200 is the intersection of hydraulic lines 202, which carries high pressure and low pressure hydraulic fluid from the direct clutch pilot valve 111; line 204, which carries fluid to a direct clutch chamber 180 of the detector valve; and line 206, which supplies line and low pressure fluid to shut off valve 208.

Line 58 carries hydraulic fluid at the pressure established by the line pressure regulator system to a manual valve having an element 212 that is movable within the chamber to the position corresponding to the setting of the shift indicator. The position of the manual valve in FIG. 3c corresponds to the neutral position of the gear selector. When the gear selector is moved to Overdrive, Drive or 1-range, line pressure in line 58 communicates directly with line 214 which carries line pressure to transfer valve 165.

TRANSFER VALVE

Figures 2A, 2B:
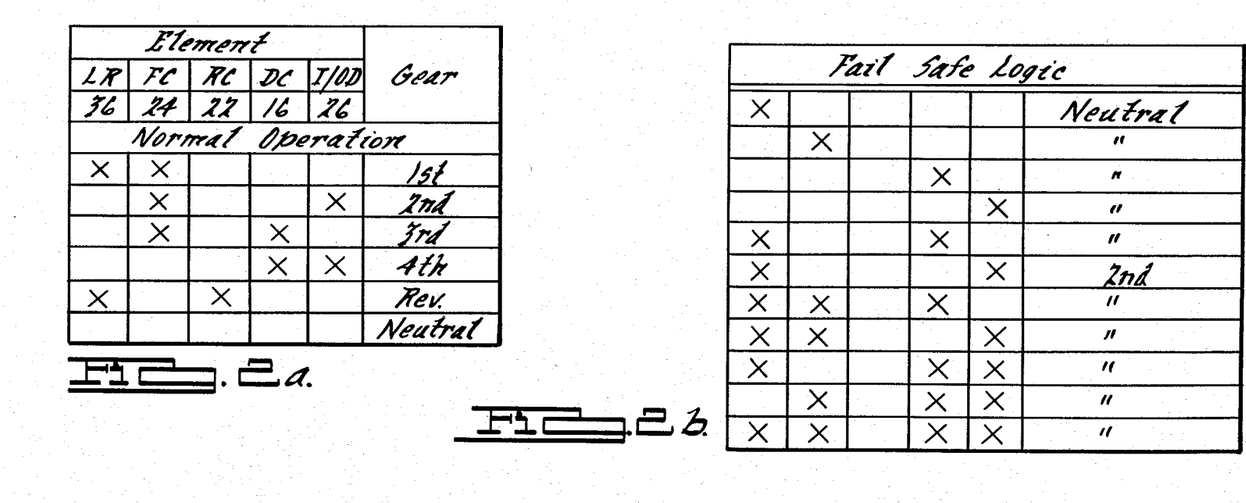
FIGS. 2A and 2B show the schedule of clutch and brake engagement required to produce the gear ratios of the transmission of FIG. 1 during normal operation and in the fail-safe condition, respectively.

A solenoid feed line 216 carries hydraulic fluid to a node 218 from which hydraulic fluid at line pressure is applied to the inlet orifices of the solenoid control valves 112–115, provided the state of the transfer valve 165 allows communication between line 214 and line 216. Spool 220 of transfer valve 165 has three lands 222, 224, 226, the spool being biased downward toward a first state into contact with the detector valve spool by a compression spring 228. The space between lands 222 and 224 communicates with chamber 230, in which spring 228 is located, through a passage 232 that extends partially along the axis of the spool and terminates in a radial passage portion. The inlet passage 233 of the transfer valve at which line 214 is connected has a bypass passage 234 through which fluid is directed to the central chamber of the valve. Either the solenoid feed line 216 or the failsafe line 236 carries hydraulic fluid at line pressure from the transfer valve depending on the position of valve spool 220 within the valve chamber. Failsafe line 236 supplies line 162 which carries fluid to check valve 160, through which the intermediate/overdrive clutch 26 is supplied during a failsafe condition, and to a second failsafe line 146, through which the cylinder of the forward clutch 24 is supplied through check valve 144 during a failsafe condition. With reference to FIG. 2a, it can be seen that the transmission operates in second gear when clutches 24 and 26 are applied.

During normal operation, spool 220 is moved downward into contact with the detector valve spool due to the force of spring 228 and the pressure force developed on land 222. With the spool in this position inlet passage 233 is closed and line pressure is communicated through bypass passage 234 to solenoid feed line 216. The axial passage 232 formed in the spool operates to produce a pressure force on land 222 that adds to the force of spring 228.

In the event of a malfunction, the detector valve moves upward and forces the transfer valve spool 220 to move upward to a second state that closes bypass passage 234, opens communication between inlet passage 233 and failsafe line 236, closes communication between inlet port 233 and vent port 240 and opens communication between the solenoid feed line 216 and the vent port 238. During normal operation, failsafe line 236 communicates with vent port 240. This assures that clutches 16, 24, 26 and servo 37 can be pressurized as they are in normal operation through the cooperative effect of the solenoid valves 112–115, pilot valves 108–111 and check valves 104–107. In the failsafe condition, line pressure cannot be applied to the inlet orifices of the solenoid valves because solenoid feed line 216 is opened to vent 238. Instead, only the intermediate/overdrive clutch 26 and the forward clutch 24 are energized because failsafe line 236 carries line pressure to check valves 144 and 160 which feed the cylinders of clutches 24 and 26. Check valves 114 and 160 open communication between failsafe line 236 and clutches 24 and 26, respectively, because the pressure in hydraulic lines 142 and 158, which are supplied through the clutch actuating system, is at a pressure equal to or lower than that of the failsafe lines.

Once transfer valve spool 220 shuttles upward to its second state or the failsafe position, the oil in chamber 230 is drained through passage 232 and vent port 238 to the sump thereby removing the pressure force from land 222 that otherwise biases spool 220 downward. When this force is removed from the spool, only the force of spring 228 opposes the force of the detector valve on spool 220 allowing it to move upward.

Once transfer valve 165 has moved to its upward position, line pressure is removed from line 216. Eventually, due to hydraulic fluid leakage, exhaust through passage 238 and exhaust through the ball check valve in clutch 116 cause the pressure in lines 194 and 204 to fall to zero. Due to the pressure in lines 172 and 198, which are pressurized from failsafe line 236, the detector valve remains in the upper position and holds the transfer valve 165 in the upper position against spring 228. When manual valve 210 is moved to a position such that line 214 is no longer supplied from line 58, the force of spring 228 moves spool 220 and the detector valve spool downward to the bottom of the chamber since no pressure forces are applied to either valve spool. When the gear selector is then moved to the Overdrive, Drive or 1-range position after having been reset by moving manual valve to Neutral or Park, line 214 pressurizes solenoid feed line 216 and chamber 230. However, the transfer valve and detector valve immediately move to the failsafe position if a failure or malfunction is sensed.

Figure 3A:
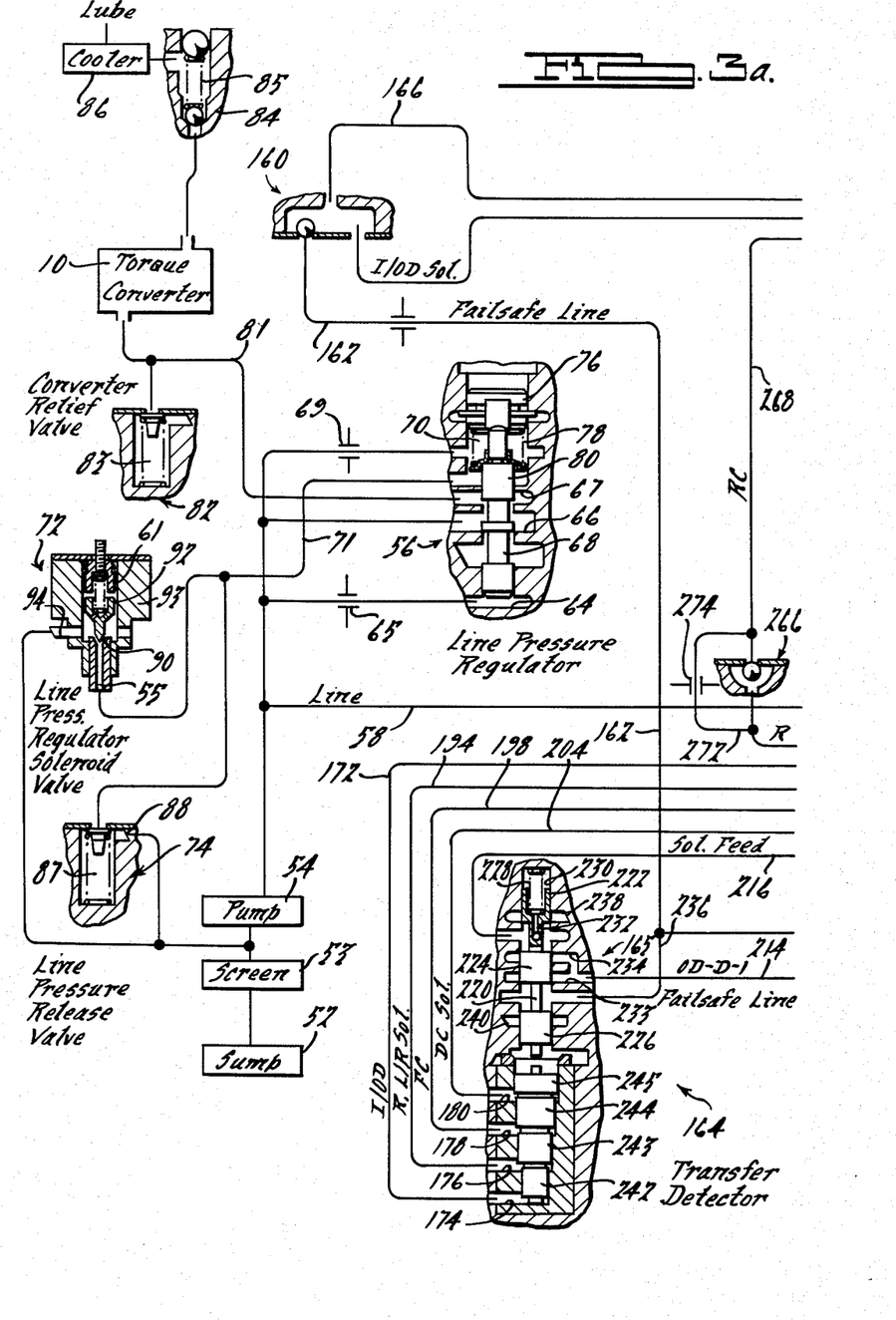
FIGS. 3A, 3B and 3C illustrate the hydraulic circuit used to control the operation of the transmission of FIG. 1.
Figure 3B:
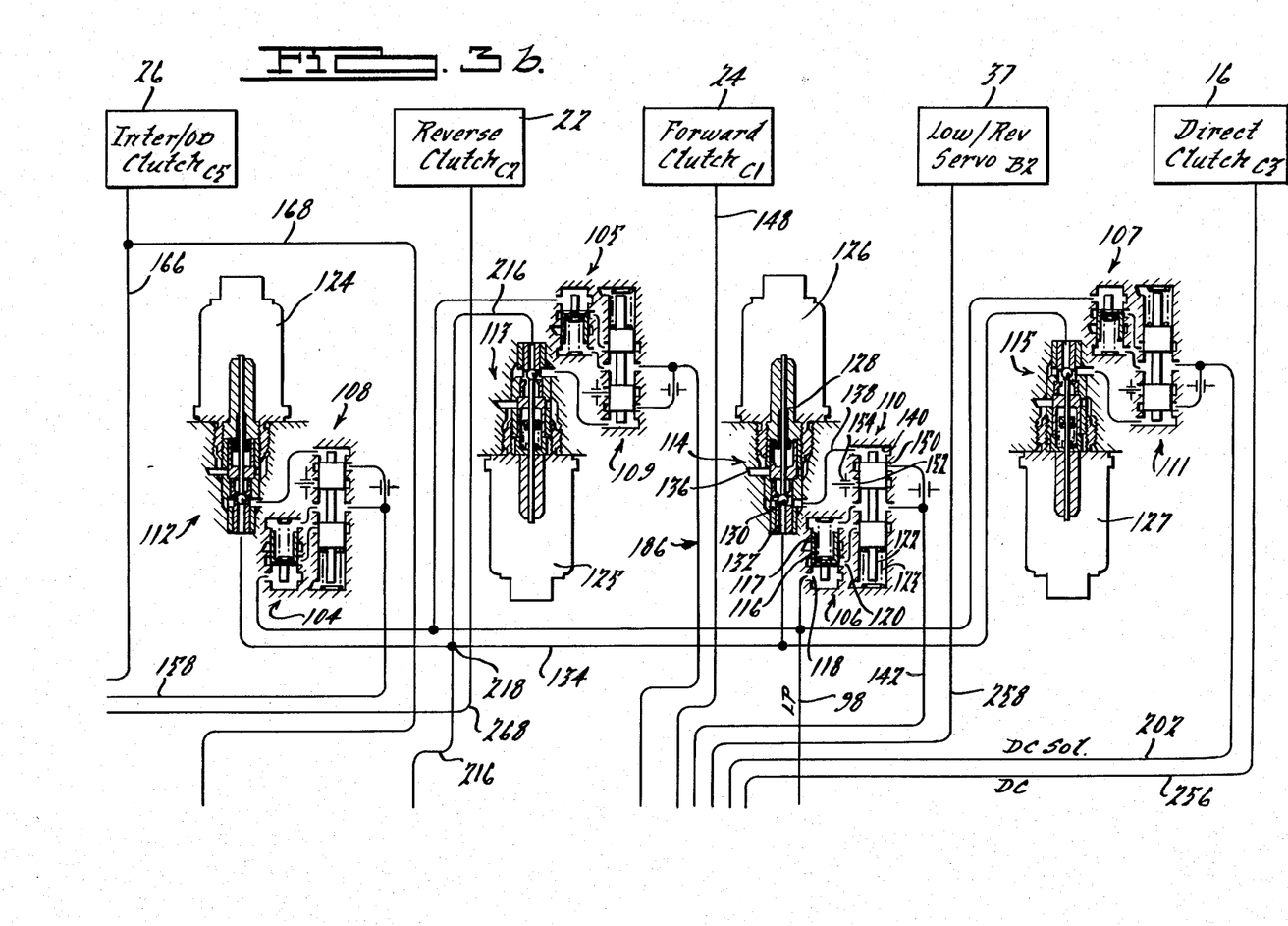
Figure 3C:
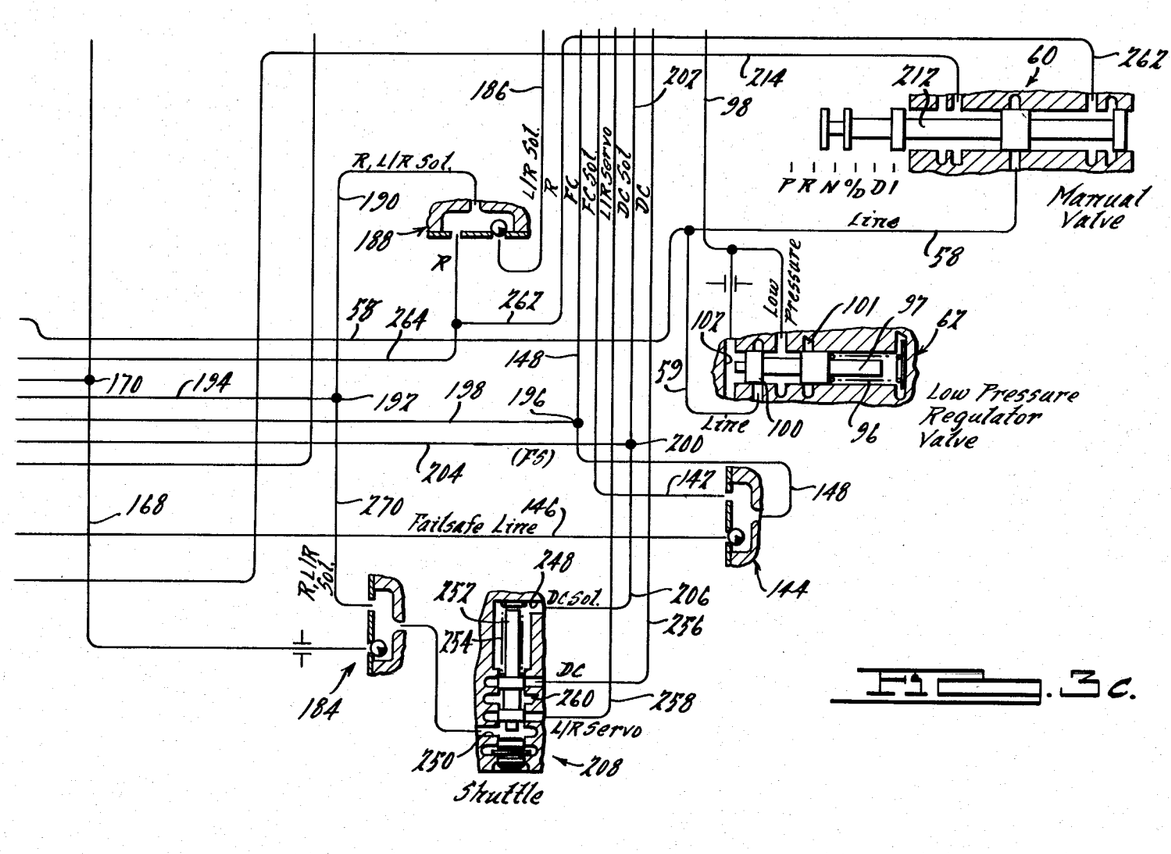
Figure 4:
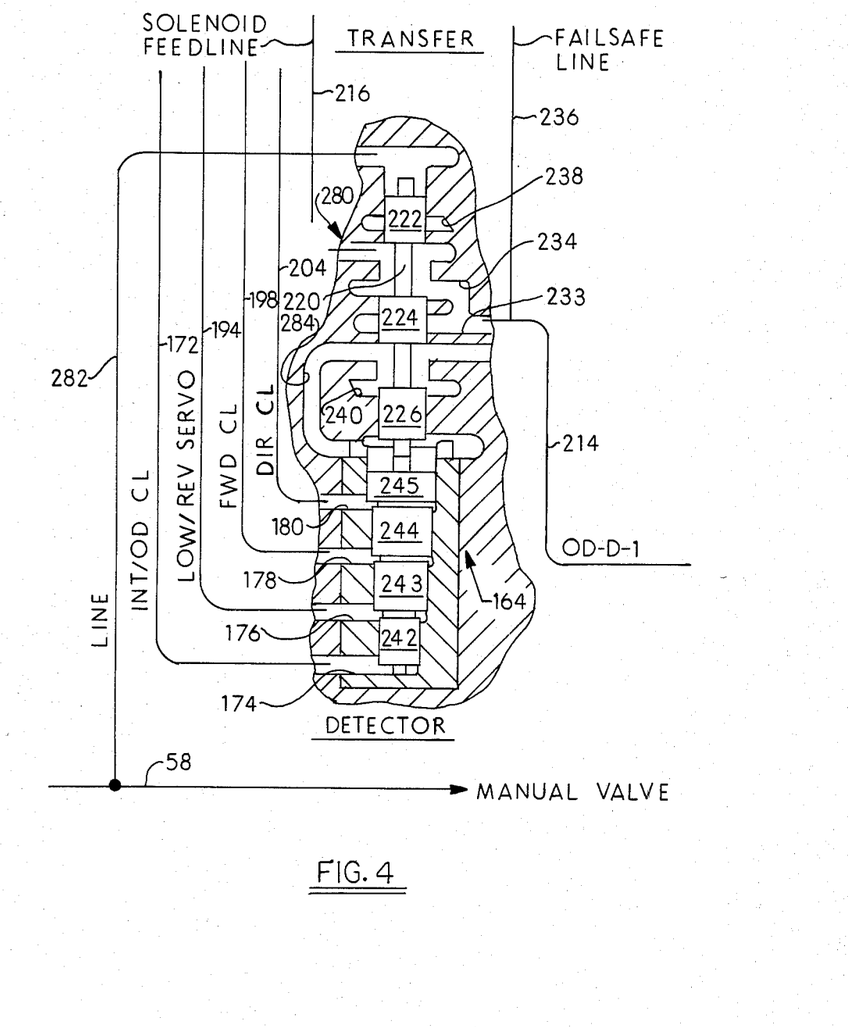
FIG. 4 shows a second embodiment and the associated hydraulic lines of the transfer detector valve illustrated in FIG. 3A.

FIG. 4 shows a second embodiment of a transfer valve 280 whose corresponding elements are marked with the same identifying numbers as those in FIG. 3a. The detector valve 164 is identical to the detector valve of FIG. 3a. While valve 230 is in its first state, i.e., in the position of FIG. 3a, pressure forces are developed on the upper area of land 224 and on the lower and upper areas of land 222, the net force being the force on land 224 and directed downward. Line 282 intersecting with line 58 applies line pressure to the other area.

In the first state, failsafe line 236 and feedback loop 284 are opened to vent 240 but solenoid feedline 216 is opened to forward drive line 214. In the event of a malfunction, detector valve 164 moves upward to its second state overcoming the net downward force on transfer valve 280 and forces valve 280 upward to its second state. There, feed line 216 is opened to vent 238 and failsafe line 236 is opened to forward drive line 214. In the second state, however, valve 280 has pressure forces on the upper area of land 222, and the lower area of land 226, the net force being upward. This holds transfer valve 280 in its second state. If pressure in line 214 is removed, the net force on spool 220 becomes the pressure force at the upper area of land 222 and valve 280 returns to the first state. Therefore, transfer valve 280 is positively held in the failsafe position while the malfunction is sensed by the detector valve and after this period until the gear selector lever is moved from the Overdrive, Drive or 1-ranges into the Park, Reverse or Neutral position where line pressure is removed from line 214. The transfer valve is reset to the normal operating position, its first state, by this movement of the gear selector because this action also removes line pressure from line 214 and chambers 174, 178 and 180 of the detector valve. However, the transfer valve and detector valve immediately move to the failsafe position if a failure or malfunction is sensed.

DETECTOR VALVE

The detector valve 164 has a valve spool on which four lands 242–245 are formed, each land having a differential area communicating with the hydraulic path that pressurizes the intermediate/overdrive clutch 26, low/reverse servo 37, forward clutch 24 and direct clutch 16, respectively. The cross sectional area of the lands increase in size from 242 to 245; thereby producing a force in the upward direction on the detector valve spool when control chambers 174, 176, 178, 180 are pressurized. During normal operation of the transmission, only two of the chambers 174–180 are pressurized concurrently, except during the shift transient when four chambers are pressurized, two of these at reduced levels. The areas of the detector valve are sized so that the net downward force of the transfer valve is greater than the net upward force of the detector valve when any two chambers 174, 176, 178, 180 are pressurized. This is true except for the concurrent pressurization of low/reverse chamber 176 and intermediate/overdrive chamber 174 for which the net upward force of detector valve exceeds the downward force of the transfer valve.

The concurrent pressurization of any three chambers, all four chambers, or chambers 174 and 176, causes the force of the detector valve to overcome the resisting force of the transfer valve thereby moving the transfer valve upward against the downward force of the transfer valve into the failsafe position. The cross sectional areas of lands 242 and 243 on which the pressure force is applied when chambers 174 and 176 are pressurized are in such proportion that concurrent pressurization of chambers 174 and 176 alone will cause entry into the failsafe position or second state. The detector valve is therefore able to detect a malfunction and hydraulically activate clutch elements 24 and 26, which produce the second gear ratio when any three chambers, all four chambers or the two chambers 174, 176 are pressurized.

SHUTTLE VALVE

The other malfunction represented by the concurrent application of line pressure to the low/reverse chamber 176 and the direct clutch chamber 180 is not sensed by the detector valve but instead is dealt with by the shuttle valve 208. The concurrent application of the low reverse servo and the direct clutch causes either the engine to lock or the driveshaft to free wheel and is considered less critical than the failure that is produced by the concurrent application of the low/reverse servo and the intermediate/overdrive clutch, which causes a driveshaft lock condition.

Direct clutch 16 is pressurized from the clutch actuating system that includes the solenoid-operated valve 115, check valve 107 and pilot valve 111 through hydraulic line 202. Lines 202, 206 communicate line pressure and low pressure fluid supplied from pilot valve 111 to an inlet port 248 at one end of the shuttle valve 208. Low/reverse servo 37 is pressurized from the low/reverse clutch control system that includes the solenoid control valve 113, check valve 105 and pilot valve 109. Line 186 carries line pressure and low pressure fluid from pilot valve 109 to check valve 188 whose output in line 190 is applied to check valve 184. The other input to check valve 184 is the connection made through line 168, which is pressurized when intermediate/overdrive clutch 26 is energized through line 166. The output of check valve 184, which is applied to the inlet port 250 of the shuttle valve, assures that the failure represented by concurrent application of line pressure to the intermediate/overdrive chamber 174 and low/reverse servo chamber 176 is accommodated through operation of detector valve 174, whereas concurrent application of line pressure to direct chamber 180 and low/reverse servo chamber 176 is accommodated through operation of shuttle valve 208.

When low/reverse pressure is applied to inlet 250 and direct clutch pressure is applied to inlet 248, spool 252 moves downward under the influence of compression spring 254, thereby communicating direct clutch pressure to direct clutch 16 to line 256. The outlet through line 258, which leads to the low/reverse servo 37, is closed when inlets 248 and 250 are pressurized. Referring to the schedule shown in FIG. 2b, the transmission operates in neutral when only the direct clutch is applied.

If the pressure force on spool 252 produced by the low/reverse servo pressure exceeds the combined force on spool 252 produced by the direct clutch pressure and the force of spring 254, spool 256 is moved to the top of the chamber, direct clutch line 256 communicates with vent port 260 and the low/reverse servo is pressurized through line 258. Again referring to the FIG. 2b, the transmission operates in neutral when only the low/reverse servo is applied.

REVERSE GEAR OPERATION

When the gear selector is moved to the reverse position, the spool 212 of manual valve 210 moves leftward opening communication between line 58 and line 262, and closes communication between line 58 and line 214. The reverse pressure and the low/reverse servo pressure from pilot valve 109 are applied to an input port of check valve 188. The output of check valve 188 is distributed at node 192 to the detector valve through line 194 and to check valve 184, from which shuttle valve 208 is supplied. Similarly, reverse line pressure is carried in line 264 to check valve 266 through which reverse clutch 22 is supplied through line 268. Bypass line 272 includes an orifice 274 that acts to slow fluid vented from the reverse clutch through the orifice rather than through check valve 266. Reverse clutch 22 is however pressurized through check valve 266.

As described previously, hydraulic fluid supplied to intermediate/overdrive clutch 26 from pilot valve 108 is used also as an input to check valve 184, the other input being reverse line pressure supplied from check valve 188. The output of check valve 184 is supplied to the input orifice 250 of shuttle valve 208. When reverse gear is selected through movement of the manual valve 210, there is no line pressure applied to direct clutch inlet 248, hence the pressure force on valve spool 252 of shuttle valve 208 does not add to the force of spring 254. Instead, the pressure force on spool 252 at the opposite end of the spool supplied from check valve 184 overcomes the force of spring 254 and the low/reverse servo is pressurized through line 258. With reference to the schedule of FIG. 2a, it can be seen that reverse drive is produced when the reverse clutch 22 and the low/reverse servo 37 are concurrently pressurized.

Having described the preferred embodiment of our invention what we claim and desire to secure by U.S. Letters Patent is:

1. An automatic power transmission mechanism for delivering torque from a power input member to a power output member comprising:

multiple speed ratio torque transmitting gearing establishing torque delivery paths between the input member and the output member;

multiple fluid pressure operated clutch and servo means for connecting and holding elements of said gearing;

a fluid pressure source;

a valve for regulating the fluid pressure from said pressure source to line pressure;

a manual valve supplied with fluid from the regulating valve for communicating fluid at line pressure to a first outlet when the manual valve is disposed in a forward drive position or to a second outlet when the manual valve is disposed other than in the forward drive position;

transfer valve means normally in a first state at which communication is open between said manual valve first outlet and a feedline, movable to a second state at which communication is open between said manual valve first outlet and a fail-safe line that carries fluid to those clutch and servo means whose pressurization produces a predetermined speed ratio;

actuating means supplied with fluid from the feedline for selectively opening and closing communication between said feedline and selected clutch and servo means whereby said clutch and servo means are engaged and disengaged and the transmission ratios thereby produced;

detector valve means continuously communicating with the output of the actuating means disposed in a first state if the output of the actuating means is the output required for normal operation in a transmission drive ratio and disposed in a second state if the output of the actuating means is other than the output required for normal operation in a transmission drive ratio, being adapted to move the transfer valve means to its second state upon movement of the detector valve means to its second state, whereby the feedline is pressurized if the output of the actuating means corresponds to normal operation in a drive ratio and whereby the failsafe line is pressurized if the output of the actuating means is other than the output required for normal operation.

2. The combination of claim 1 further comprising shuttle valve means continuously communicating with the output of a portion of the actuating means whose output if pressurized is other than the output required for normal operation in a transmission drive ratio, adapted to pressurize a portion of the clutch and servo means that produces no torque transmission between the input member and the output member thus placing the transmission in neutral.

3. The combination of claim 1 wherein the transfer valve is biased by a force toward its first state which force biases the detector valve toward its first state and wherein the detector valve further comprises a valve spool movable between first and second states having spaced lands that define differential area pairs between adjacent lands, each pair communicating with the output of the actuating means through which a clutch or servo means is pressurized, whereby pressure force exceeding the force that biases the transfer valve to its first state such that the detector valve and transfer valve are moved toward their second state if the output of the actuating means is other than the output required for normal operation in a transmission drive ratio.

4. The combination of claim 1 wherein the net pressure force on the detector valve is less than the bias force on the transfer valve if the output of the actuating means is the output required for normal operation in a transmission drive ratio.

5. The combination of claim 3 wherein the net pressure force on the detector valve is less than the bias force on the transfer valve if the output of the actuating means is the output required for normal operation in a transmission drive ratio.

6. The combination of claim 1 wherein the transfer valve while in its first state is biased by a force toward its first state which force biases the detector valve toward its first state and wherein the detector valve further comprises a valve spool movable between first and second states having spaced lands that define differential area pairs between adjacent lands each pair communicating with the output of the actuating valve means whereby pressure forces are developed on the areas as the various actuating means outputs are pressurized, the net pressure force being less than the bias force such that the transfer valve and detector are in their first state of the output of the actuating means is the output required for normal operation in a transmission drive ratio.

7. The combination of claim 5 or 6 wherein the bias force and the net pressure force vary as the line pressure varies.

8. The combination of claim 3 wherein the transfer valve disposed in its second state, is biased by a force toward its second state.

* * * * *